Jan. 14, 1964 J. STERN 3,117,491

INFORMATION RETRIEVAL APPARATUS

Filed June 29, 1962 5 Sheets-Sheet 1

INVENTOR
Joshua Stern

BY David Robbins ATTORNEY
Alvin J. Englert AGENT

INFORMATION RETRIEVAL APPARATUS

Filed June 29, 1962

INVENTOR
Joshua Stern
BY David Robbins ATTORNEY
Alvin J. Englert AGENT

INVENTOR

Joshua Stern

BY David Robbins ATTORNEY

Alvin J. Englert AGENT

INFORMATION RETRIEVAL APPARATUS

Filed June 29, 1962 5 Sheets-Sheet 4

INVENTOR

Joshua Stern

BY David Robbins ATTORNEY
Alvin J. Englert AGENT

Jan. 14, 1964 J. STERN 3,117,491

INFORMATION RETRIEVAL APPARATUS

Filed June 29, 1962

5 Sheets-Sheet 5

INVENTOR

Joshua Stern

BY David Robbins ATTORNEY

Alvin J. Englert AGENT

3,117,491
INFORMATION RETRIEVAL APPARATUS

Joshua Stern, Chevy Chase, Md., assignor to the United States of America as represented by the Secretary of Commerce Filed June 29, 1962, Ser. No. 207,170
7 Claims. (Cl. 88—24)

This invention relates to information retrieval apparatus, and more particularly to apparatus for mechanizing certain of the steps involved in retrieving information by the peek-a-boo technique.

In recent years, the difficulties encountered in retrieving information contained in published literature (documents) have become acute because of the rate at which such documents are appearing. To cope with the problem, various efforts have been made to develop complex machines that will search a vast memory automatically and furnish the documents sought in a desired form. Unfortunately, such machines usually are costly and require a centralized mode of operation. Even if centralization is not a requirement, they are frequently of such a nature that they inhibit direct contact of the searcher with the results of the search during progress thereof.

The apparatus of the present invention is relatively inexpensive, needs not be centralized, and provides a continuous indication of the results of a search as the search progresses. It is based on the peek-a-boo technique, wherein given sets of documents are indexed on associated sets of optical coincidence members such as cards, film sheets or the like, commonly designated as peek-a-boo members. Peek-a-boo cards, for example, are punched cards, each of which represents an index term and has punched therein peek-a-boo indications comprising holes whose positions identify documents pertaining to the index term. In the most common search operation performed with peek-a-boo cards, the peek-a-boo cards of a search prescription are stacked in alignment, whereby the positions of holes that remain unobscured by any of the cards in the stack identify the documents satisfying the prescription.

In the ordinary use of the peek-a-boo cards, the position of a hole common to all cards in a stack of cards is interpreted by the searcher as a document serial number by means of a coordinate grid printed upon the card or upon a transparent overlay. The searcher is directed by these serial numbers to a file (serial storage) of citations and abstracts of the documents sought or to a file of the documents themselves. It has been found that searchers such as scientific personnel, whose primary functions are not searching, tend to copy all document serial numbers without checking each in turn, thereby failing to avail themselves of the continuous indication of search progress that is embodied in the apparatus. Moreover, such occasional searchers often are predisposed to regard unfavorably apparatus involving serial numbers and file cabinets. Since the occasional searcher is often the one who would benefit most from the use of the peek-a-boo technique, it would be desirable to eliminate the need to copy a serial number and proceed to a file. It would be highly desirable to provide a short abstract, extract, summary, or the like, of the document associated with a peek-a-boo indication common to a stack of peek-a-boo members in response to the simple setting of selector means on the indication by the searcher.

The primary objective of the present invention is to provide apparatus which embodies the above-described desired features. In brief, the apparatus is adapted for use with sets of peek-a-boo members for which corresponding abstracts, extracts, summaries, or the like, have been prepared and whose microimages have been recorded on some medium, such as a sheet of photographic film. The microimages are arranged in an array that is in one-to-one correspondence with the array of holes in the peek-a-boo members. The film sheet associated with the peek-a-boo set being searched is selected and mounted on a carriage member whose range of movement is such that any microimage on the film sheet may be positioned in operative relationship with image-projecting means. The operator arranges selected peek-a-boo members on a suitable surface and manipulates controls to position selector means on each peek-a-boo indication in turn. The apparatus is so arranged that movement of the controls causes the film sheet carriage member to be positioned and automatically aligned with respect to the image-projecting means, whereby an enlarged, readily readable, focused, and centered image of the abstract or the like corresponding to that position is projected on a screen in front of the searcher as the selector is set on each of the peek-a-boo indications common to all peek-a-boo members in turn. Thus the searcher is immediately informed of the nature of each document retrieved in turn by his search prescription, enabling him to guide his search effectively. For example, he can rapidly detect and adjust for such contingencies as misinterpretation of index terms by indexer and searcher, unanticipated interference from information of whose existence he was unaware, misconceptions about the volume of relevant information in the collection, and even modification of his interest as he acquires new information. Central to the conception of the role of the machine and of the role of the searcher is the existence of a close bond or communication link between the two. The net result, in servomechanism terminology, is to make the searcher an element of a real-time feedback loop. Accordingly, depth or specificity of search may be readily adjusted. The benefit deriving therefrom is that the searcher is enabled to browse the collection of abstracts and hence, indirectly, of the documents themselves.

Another object of this invention, therefore, it to provide information retrieval apparatus for use with peek-a-boo members, which mechanizes the operation of obtaining a document abstract or the like on the basis of the corresponding peek-a-boo indication, whereby the operator may readily evaluate the progress of his search and modify the search prescription if necessary.

Another object of this invention is to provide apparatus for use with peek-a-boo members which is operated by the simple, convenient act of setting a selector over a peek-a-boo indication to obtain an abstract or the like corresponding to that indication.

A further object is to provide apparatus for use with peek-a-boo members which is operated by setting a selector over peek-a-boo indications and which displays enlarged images of abstracts or the like, the apparatus automatically centering the image so that the operator need not exercise excessive care and time in setting the selector.

These and other objects of the present invention will be apparent from the following description when taken in conjunction with the drawings, wherein like reference numerals refer to like parts throughout the figures, and wherein.

Figure 1:
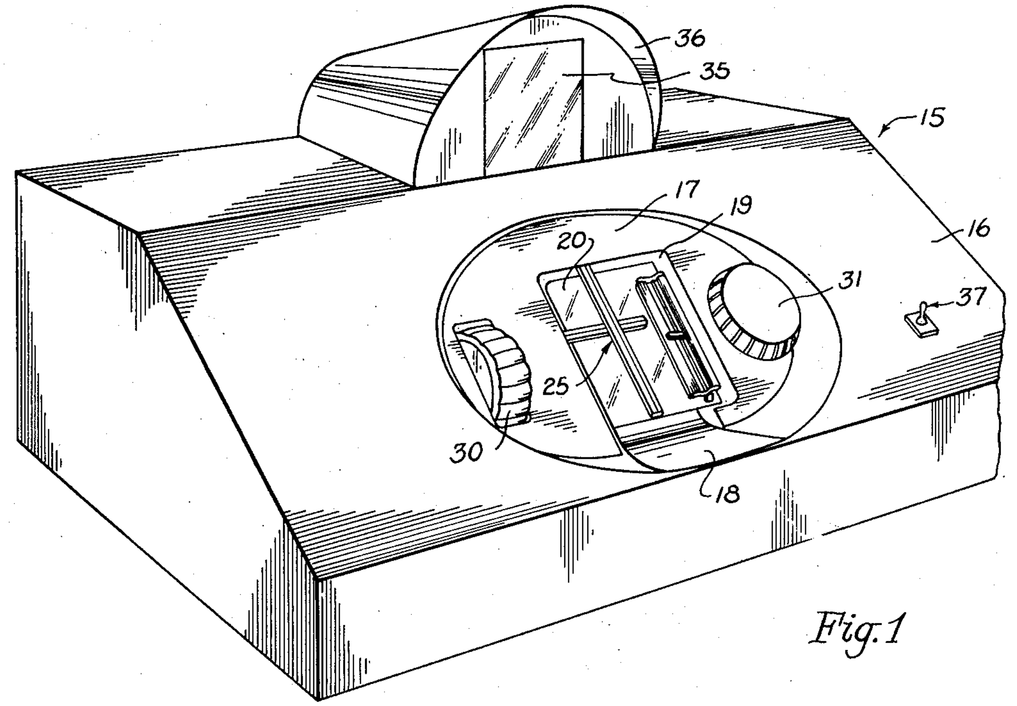
FIG. 1 is a perspective view of a preferred embodiment of information retrieval apparatus constructed in accordance with the principles of the present invention.

In a preferred embodiment of information retrieval apparatus constructed in accordance with the invention and illustrated in FIG. 1, a cabinet structure 15 is provided to house the apparatus so that it may conveniently be placed on a desk, table or the like. The cabinet structure 15 includes a sloping front 16, the central portion 17 of which is depressed and inclined to form a lower ledge 18. An opening 19 is provided in the central portion 17 to afford access to a surface 20 that is adapted to receive peek-a-boo members. Arranged to select any desired peek-a-boo indication, to be described hereinafter, are selector means 25, which are actuated by the control members 30, 31. Disposed on the top portion of the cabinet structure 15 is a viewing screen 35, which is protected from overhead glare by a shield 36. In use, enlarged images of microimages disposed in the cabinet structure 15 are projected onto the screen 35, the particular image displayed being selected by the aforementioned control members 30, 31. To provide electrical energy for the apparatus, a conventional power cord (not shown) is provided, the energy being controlled by a switch 37 disposed on the sloping front 16.

Figure 2:
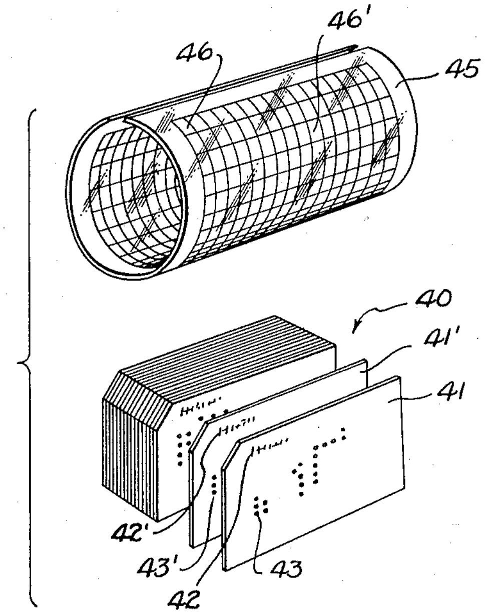
FIG. 2 is a perspective view of a preferred embodiment of a peek-a-boo card set and its associated film sheet for use with the apparatus of FIG. 1.

FIG. 2 illustrates a typical set of peek-a-boo members 40 and associated film sheet 45 adapted for use in the apparatus shown in FIG. 1. The set of peek-a-boo members 40 comprises an index to a collection of documents (not shown) such as published articles, patents, and the like, which have been characterized by index terms. Reference may be had to chapter 6 of the volume entitled "Punched Cards," by Casey et al., published by Rheinhold, New York (1958), for a discussion of the manner in which documents are characterized by index terms. For present purposes, index terms may be thought of as being similar to the index words contained in the ordinary index to a book, magazine, or the like. In the peek-a-boo technique, the documents are divided into convenient sets, the maximum number of documents in a set being determined by the capacity of the peek-a-boo members, as explained hereinafter. Accordingly, a set of index terms associated with each set of documents is evolved.

Having arrived at sets of documents and associated sets of index terms, each set of index terms is handled as follows. Each index term of the set is assigned a peek-a-boo member, as illustrated by index term 42 assigned to the card 41, which is a member of the set of peek-a-boo members 40 of FIG. 2. The index term 42 is disposed on the card 41 in any convenient manner, as by writing, typewriting, or the like. In similar manner, index term 42′ is disposed on card 41′. The area of any card, such as card 41 or 41′, is divided into an array of possible indication, or hole, positions, with each position dedicated to a particular document of the set of documents. The positions of documents pertaining to index term 42 of card 41 are accordingly punched, as illustrated by the typical peek-a-boo indication comprising hole 43. Similarly, the positions of documents pertaining to index term 42′ are punched as illustrated by hole 43′ in card 41′. Thus the collection of holes on card 41, for example, directly identifies all documents relating to the index term 42. Conversely, each member of the set 40 representing terms related to a given document will have a hole at the identical position for that document, and all others of the set of members 40 will have no hole at that position. Accordingly, if two or more cards such as cards 41, 41′ are selected and stacked (i.e., superimposed), holes which are not obscured but common to all cards identify documents each of which relates to all of the selected index terms. The result of such stacking operation is commonly referred to as the "logical product" and is the most common function performed with the peek-a-boo technique. Other functions are possible, but are not essential to the present apparatus.

The maximum number of documents that can be handled by a set of peek-a-boo members is of course dependent on the maximum number of possible hole positions. In a preferred embodiment, the peek-a-boo members 40 consists of 5″ x 8″ vinyl plastic cards having a capacity of 18,000 holes arranged in 180 columns and 100 rows, the holes being 1 mm. between centers and 0.6 mm. in diameter. Such cards are conveniently handled by the indexer and searcher, are durable, and dimensionally stable with changes in temperature and humidity. The present invention is not limited to the above-described cards, but may be employed with any peek-a-boo member, such as film strips, film sheets, or the like. Moreover, instead of using holes to provide optical coincidence, nonpunched, light transmitting areas may be used if desired. In such case, the peek-a-boo members may be microforms, and the stacking operation may be performed by using projected images thereof at the surface 20.

Referring now to the film sheet 45 illustrated in FIG. 2, it will be noted that it has an array of microimages such as microimages 46, 46′ thereon. The array of microimages corresponds on a one-to-one basis with the array of possible peek-a-boo hole positions of the peek-a-boo members 40. Thus, in the embodiment wherein the set of members 40 has an array of 180 by 100 peek-a-boo holes or indications, the film matrix 45 has a corresponding array of 180 by 100 microimages. Each microimage such as microimage 46 is therefore associated with the document identified by the position of that microimage in the array.

In an illustrative embodiment, each microimage such as microimage 46 is a microfilm of a brief summary of the contents of the associated document. The short summary consists of the usual "abstract" plus a citation of the complete document. The summary is such that it may be read in a period consistent with the operation times of the apparatus to determine whether the document corresponding to the summary is in accordance with the desires of the searcher.

Figure 3:
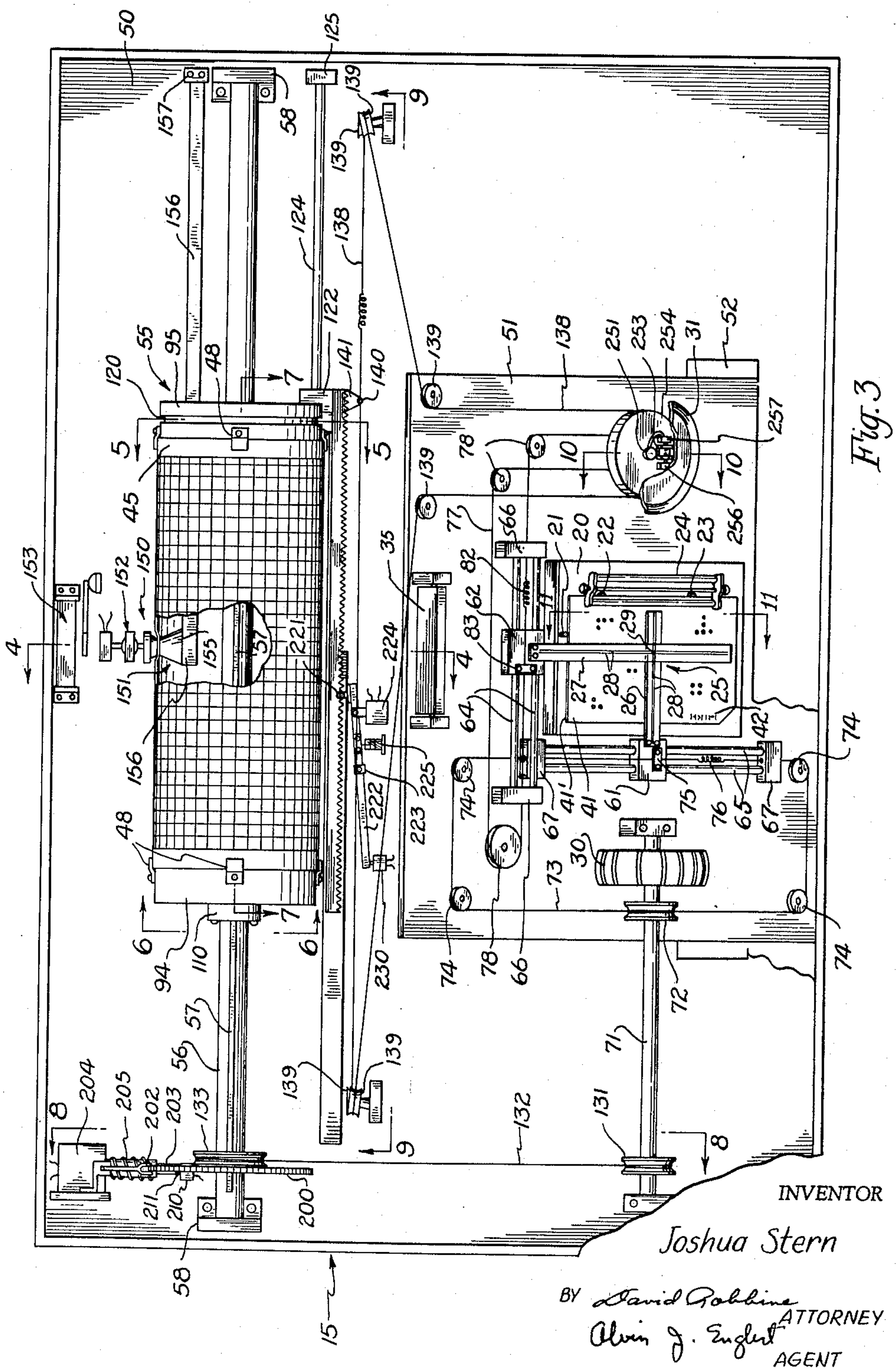
FIG. 3 is a plan view of the apparatus of FIG. 1, in which the top covers have been removed to show the mechanisms contained therein.

Referring now to FIGS. 1 and 3, it may be seen that the cabinet housing 15 contains a large horizontal base plate 50 coextensive with the bottom thereof, and a smaller inclined plate 51 approximately coextensive with the central portion 17 of sloping front 16. The inclined plate 51 forms an angle of approximately 45° with the base plate 50 to position the surface 20 substantially normal to the operator's line of vision. The bottom portion of the inclined plate 51 extends through a rectangular opening 52 provided in base plate 50. Carried by the inclined plate 51 are the surface 20, selector 25, control members 30, 31 and screen 35, while base plate 50 carries the film sheet carriage 55 and image-projecting means indicated generally at 150, and to be described hereinafter.

As shown in FIG. 3, surface 20 is provided with three short pins 21–23 which serve to accurately align peek-a-boo cards such as cards 41, 41′ thereon. Clip mechanism 24 is provided to hold the cards in the aligned position.

Figure 11:
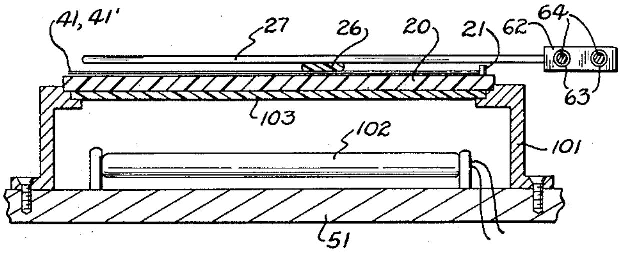
FIG. 11 is a sectional view of the illuminated card supporting plate, taken on the line 11—11 of FIG. 3.

To easily identify unobscured holes in the cards, the surface 20 is translucent and is illuminated from beneath, as shown in FIG. 11. Surface 20 is carried by a box-like member 101 attached to inclined plate 51 and enclosing a fluorescent light tube 102. Disposed immediately under surface 20 is a sheet 103 of blue filter material which serves to increase the contrast between the holes and card material of the peek-a-boo cards 41, 41′.

Still referring to FIGS. 11 and 3, it may be seen that the selector 25 for selecting peek-a-boo indications consists of two coordinate cursors 26, 27 each consisting of a thin, flexible, strip of clear plastic material upon which is engraved two parallel lines 28. In this manner, the intersection of the cursors forms a small square 29 which can be readily set over a peek-a-boo indication on the cards 41, 41′, as will be explained hereinafter.

Each of the cursors 26, 27 is attached to a respective bearing block 61, 62. As shown in FIG. 11, bearing block 62 is provided with linear ball bearings 63 to reduce the friction between the bearing block and the rails 64 upon which it rides. Bearing block 61 is similarly provided with linear ball bearings (not shown) and rides on rails 65. Rails 64 are attached at their ends to supporting blocks 66 which in turn are attached to the inclined plate 51. The rails 64 are disposed slightly higher than rails 65 (which are attached to blocks 67 connected to the plate 51), whereby the rails 64 may overlay the rails 65.

As previously mentioned, the selector 25 is operated by means of the control members 30, 31. To accomplish the foregoing, the control members 30, 31 are connected to cursors 26, 27, respectively, via cable linkages. Specifically, the control member 30, which is a wheel adapted to be turned by hand, is operatively associated with a shaft 71, in a manner to be described hereinafter. Attached to the shaft 71 is a drive pulley 72 around which several turns of a cable 73 are wound, the cable being guided by idler pulleys 74 and attached to bearing block 61 by means of a clamp member 75. Spring 76 is inserted in the cable run to tension the cable and thereby prevent slippage at pulley 72. Actuation of control member 30 thus translates cursor 26 over the length of reference surface 20.

Figures 10, 14:
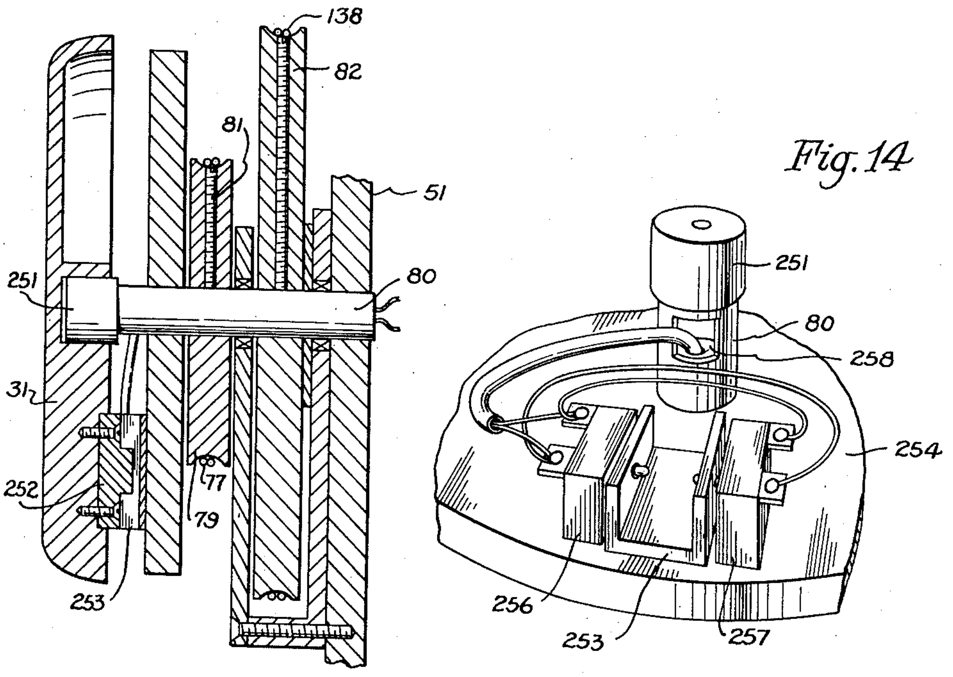
FIG. 10 is a sectional view of the translational control member, taken on the line 10—10 of FIG. 3.
FIG. 14 is a detailed perspective view of the switches forming part of the control member shown in FIGS. 3 and 10.

Referring now to FIGS. 3 and 10, the cable linkage between the other control member 31 and cursor 27 may be seen. Attached to bearing block 62, which carries cursor 27, is a cable 77 which in turn is run over idler pulleys 78 to a drive pulley 79, shown in FIG. 10. Pulley 79 is attached directly to shaft 80 by means of a recessed set screw 81, whereby pulley 79 is operatively associated with control member 31. The relation between control member 31 and shaft 80, FIG. 10, will be explained hereinafter. Returning to cable 77, it will be seen that it is wound several times around pulley 79, tensioned by means of a spring 82 and clamped to bearing block 62 by clamp 83, whereby slippage at pulley 79 is prevented.

Referring now to FIGS. 3 and 5–7, the film sheet carriage 55, FIG. 3, will be described. As seen best in FIG. 7, the film sheet 45 is detachably mounted on a generally spool-shaped carriage 55 by means of clips 48. This spool-shaped carriage 55 consists of circular end plates 91, 92, see FIGS. 5 and 6, having central bores therein that engage a circular tube 93. On their outer edges the end plates 91, 92 engage short sections (rims) 94, 95 of large diameter tubing. The tubes 93, 94, and 95 are fastened to the end plates 91, 92 by any convenient means, as by welding.

Concentrically disposed within the interior of tube 93 is a shaft 56 which is engaged by linear ball bearings 96, 97 attached to the tube 93. The left-hand portion of shaft 56 carries a key 57, and bearing 96 accordingly is less than a full circle to accommodate it.

Figure 6:
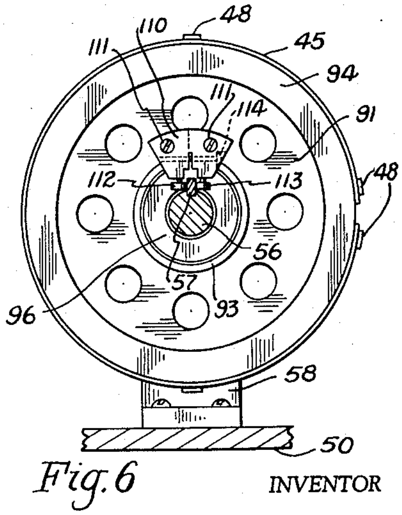
FIG. 6 is an end view of the left end of the spool, taken on the line 6—6 of FIG. 3.

As best seen in FIG. 6, the end plate 91 is provided with means to engage key 57 so that the carriage 55 may be rotated by rotating shaft 56. Such means comprise a wedge-shaped block 110 attached to end plate 91 by screws 111 and having depending therebeneath a pair of ball bearings 112, 113, that bear on opposite sides of key 57. The pressure exerted by bearings 112, 113 on key 57 is adjustable by means of a screw 114 passing through the width of wedge-shaped block 110, the block being split to provide the necessary spring action. From the foregoing, it will be evident that rotation of shaft 56, which extends across the width of horizontal base plate 50 and is carried by supports 58 attached to plate 50, FIG. 3, will result in rotation of the film carriage 55.

Figure 5:
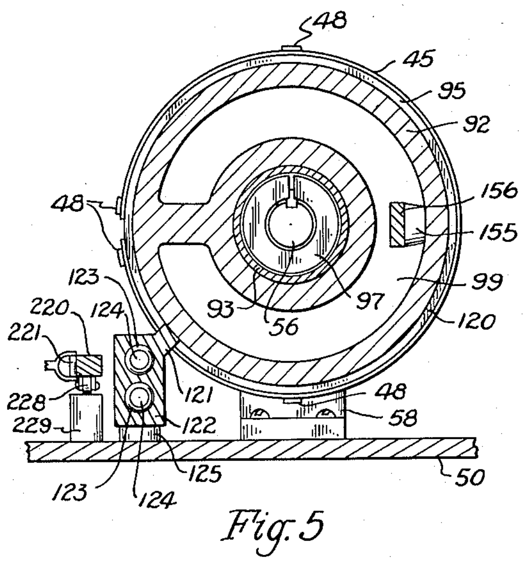
FIG. 5 is a sectional view of the right end of the spool for holding the film sheet, taken on the line 5—5 of FIG. 3.
Figure 9:
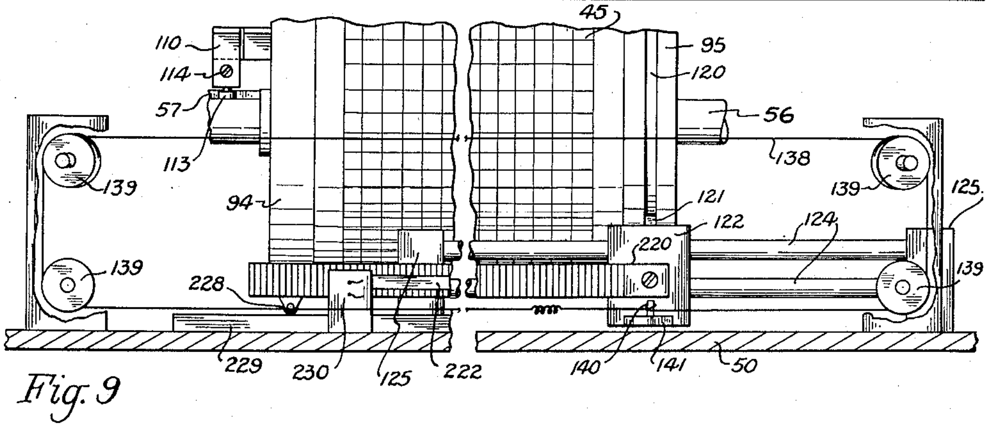
FIG. 9 is a front elevation of the translational drive and indexing means for the spool, taken on the line 9—9 of FIG. 3.
Figure 7:
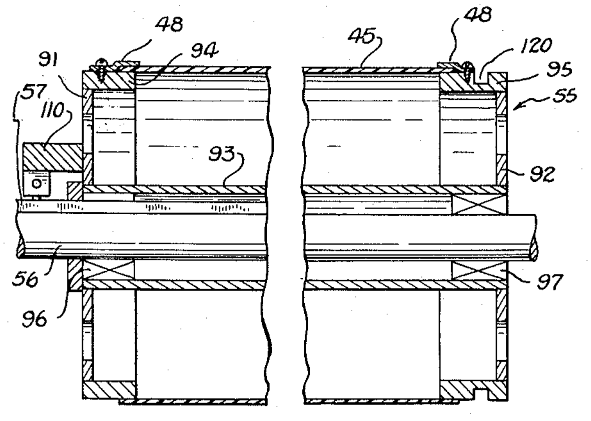
FIG. 7 is a longitudinal sectional view of the spool, taken on the line 7—7 of FIG. 3.

Film carriage 55 is further adapted to be translated axially along shaft 56. With reference to FIGS. 5, 7 and 9, it will be seen that the short outer tube 95 of carriage 55 is provided with a groove 120 that is engaged by a dog 121, FIG. 5, carried by a bearing block 122. Bearing block 122 is provided with linear ball bearings 123 that engage rails 124. As shown in FIG. 9, the rails 124 are attached to supports 125 that in turn are attached to base plate 50, the rails being parallel to the shaft 56. Accordingly, translation of bearing block 122 serves to translate the film carriage 55, without impeding rotation thereof, via the action of dog 121 in groove 120.

As previously mentioned, the film sheet carriage is rotated and translated by the operation of the control members 30, 31. The foregoing is accomplished by means of cable linkages, reference being had now to FIGS. 3 and 8. Attached to shaft 71 associated with control member 30 is a drive pulley 131 which is linked by cable 132 to a driven pulley 133 which in turn is keyed to shaft 56 by key 57. The cable 132 is wrapped several times around each of pulleys 131, 133 to prevent slippage thereon, and is tensioned by means of a spring 134, FIG. 8, that is connected between one end of cable 132 and a pin 135 disposed on the inward side of pulley 133. Accordingly, rotation of control member 30 causes rotation of shaft 56, which as previously set forth, causes rotation of the film sheet carriage 55.

Control member 31, FIG. 3, is similarly linked to drive bearing block 122 so as to translate the carriage 55. As shown in FIG. 10, the shaft 80 which is associated with control member 31 carries a pulley 82 around which a cable 138 is wound several times. Cable 138 is guided by six idler pulleys 139, FIG. 3, and connected to an upright pin 140 that is attached to an arm 141 extending from the bearing block 122, see FIGS. 3 and 9.

Referring again to FIG. 3, it will be seen that as the film sheet carriage 55 is rotated and translated by operation of the control members 30, 31, any of the microimages in the array of microimages on film sheet 45 may be positioned in operative relationship with an image-projecting means indicated generally at 150. The latter means comprises a projection lamp 151, lens 152, mirrors 153 and, in addition, the viewing screen 35 disposed on the top portion of inclined plate 51. Turning to the projection lamp 151, it will be seen that it comprises a housing 155 carried at the end of an arm 156 which extends through the right-hand end plate 92 (see FIG. 5) of carriage 55, end plate 92 having a suitable C-shaped opening 99 therein to accommodate the arm 156 as the carriage 55 rotates less than a full revolution. The arm 156 at the end opposite the light housing 155 is carried by a bracket 157, FIG. 3, attached to base plate 50.

Figure 4:
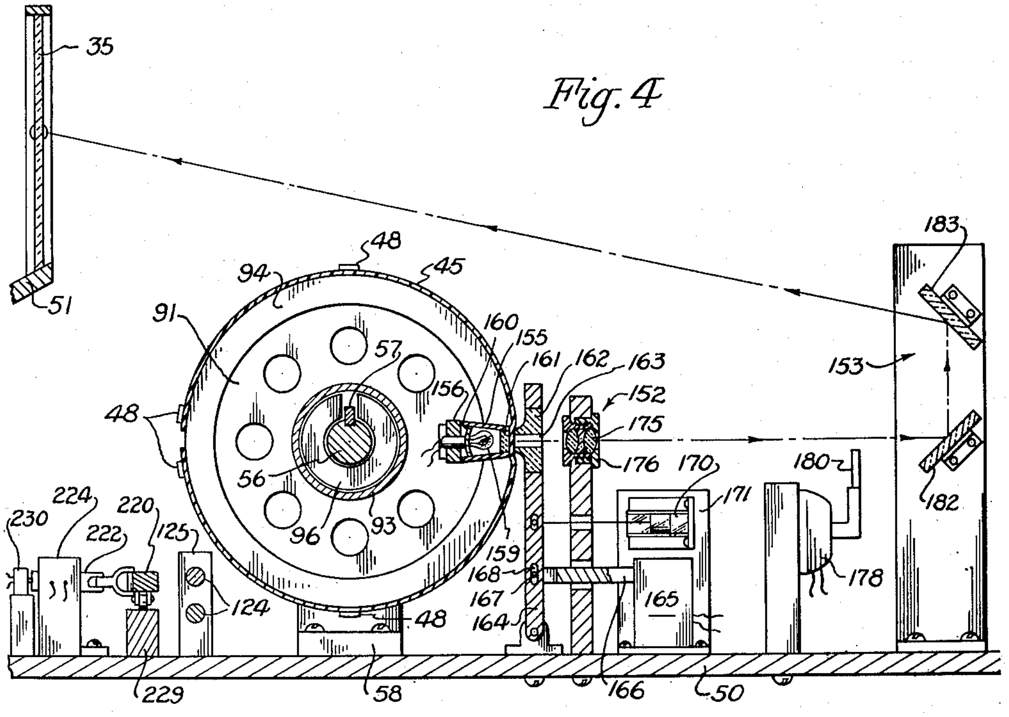
FIG. 4 is a sectional view of the optical elements of the apparatus taken on the line 4—4 of FIG. 3.

As shown in FIG. 4, the housing 155 contains a lamp 159, a reflector 160 and an optically flat window 161. The housing 155 is so arranged that the window 161 does not contact film sheet 45 during movement of the carriage 55, FIG. 3. In FIG. 4, the film sheet 45 is shown pressed against the optically-flat window 161 by a film flattener 162, whereby the film sheet 45 is slightly deformed from its normally cylindrical shape. The purpose of the film flattener 162 is, of course, to position the film in a fixed, flat object plane to obtain a clear image of the film.

The flattener 162, which is generally doughnut shaped with an opening 163, is carried by a pivoted arm 164. The arm 164 is actuated by a solenoid 165 whose plunger 166 is biased outward by an internally contained spring. Plunger 166 is connected to the pivoted arm 164 by means of a pin 167 that engages a slot 168 in arm 164 so that the plunger 166 does not experience vertical stresses as the arm 164 rotates. To prevent the flattener 162 from damaging the film, the pivoted arm 164 is attached to an air dashpot 170 carried by a bracket 171 attached to base plate 50. The dashpot 170 damps the motion of arm 164 in the direction towards the film. From the foregoing, it will be evident that application of energizing current to solenoid 165 causes flattener 162 to be withdrawn from the film sheet 45 so that the latter may be moved by its carriage without undesirably contacting the window 161, and that interruption of energizing current to solenoid 165 causes flattener 162 to gently press the film sheet 45 against the optically flat window 161. The manner in which the energizing current is applied and interrupted will be described hereinafter.

The next element of the image-projecting means 150, FIG. 3, is the lens 152 which is best seen in FIG. 4. This lens preferably consists of an achromatic lens element 175 carried in focussing ring 176.

As will readily be appreciated, it is desirable that the projection means be blanked out when the film sheet 45 is being moved. To accomplish this objective, the rotary solenoid 178, FIG. 4, is provided behind the lens 152, and carries an opaque flag 180 which is moved upwards by the solenoid to block the projected image. The rotary solenoid 178 is spring biased downwards so that the flag 180 is lifted only when the solenoid is energized, in a manner to be described hereinafter.

To display the image produced by the image-projecting means on the viewing screen 35, mirrors 182 and 183, FIG. 4, are arranged to reflect the projected light upwards and back towards the front of the apparatus where the screen 35 is pivotally-mounted on inclined plate 51.

From the foregoing, it will be evident that when the lamp 159 is lighted and solenoids 165 and 178 are deenergized, the film sheet 45 is pressed against the window 161 and thereby into coincidence with a predetermined object plane, so that a focused image appears on the viewing screen 35. It is evident also that application of energizing current to the solenoids 165 and 178 causes the viewing screen 35 to be darkened and film sheet 45 to be released so that the film sheet carriage 55, FIG. 3, may be moved without injury to the film sheet.

Figure 8:
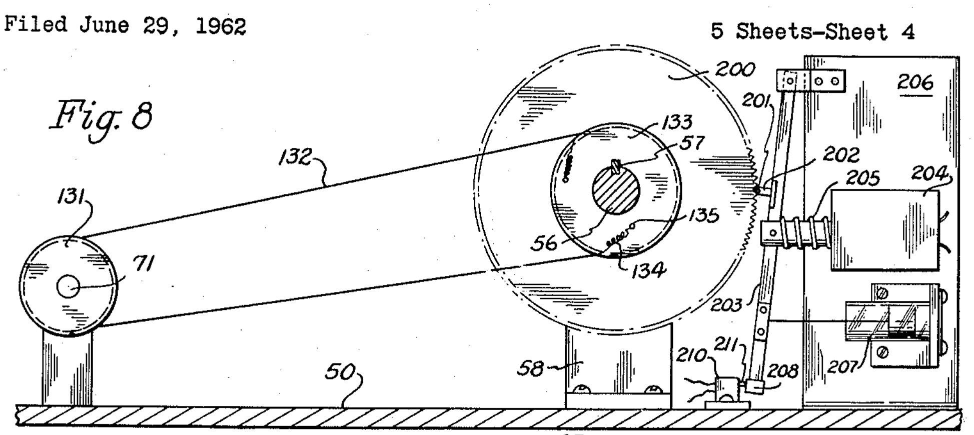
FIG. 8 is a side elevational view of the rotational drive and indexing means for the spool, taken on the line 8—8 of FIG. 3.
Figure 12:
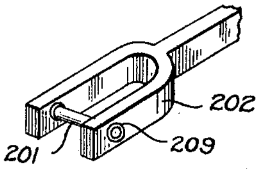
FIG. 12 is a detailed perspective view of a part of the detent pin mechanism shown in FIG. 8.

The means by which the film carriage 55, FIG. 3, is automatically indexed will now be described. Keyed to the left end of shaft 56 is a toothed wheel 200 which has a plurality of evenly-spaced teeth as seen best in FIG. 8. The angle between adjacent teeth corresponds to the angle of rotation of shaft 56 that advances film sheet 45, FIG. 3, one horizontal row. As shown in FIG. 8, toothed wheel 200 is arranged to be engaged by a detent pin 201. The detent pin 201, shown best in FIG. 12, extends between the ends of a U-shaped member 202, and is carried by miniature ball bearings 209 whereby the pin easily engages the teeth of wheel 200. Referring again to FIG. 8, it will be seen that the member 202 it attached to a long lever 203 that is actuated by a solenoid 204, biased outwardly by a spring 205, lever 203 being pivoted at its top end to a bracket 206 attached to base plate 50. Also interconnected between the lever 203 and bracket 206 is an air dashpot 207 to prevent the detent pin 201 from being damaged by the action of spring 205. At the lower end of lever 203 is a small block 208 that engages the operating button 211 of a microswitch 210. This microswitch is normally closed, being opened when button 211 is depressed. The purpose of microswitch 210 will be explained hereinafter. For present purposes, it will suffice to summarize that energization of solenoid 204 causes detent pin 201 to be withdrawn from toothed wheel 200 so that shaft 56 to which it is secured may be rotated, and causes microswitch 210 to be closed. Conversely, when solenoid 204 is deenergized, detent pin 201 gently engages toothed wheel 200, causing the film matrix 45 to be indexed so that the selected row of microimages is aligned with the projection means 150 of FIG. 3. In addition, microswitch 200 is opened.

The translational movement of the film carriage 55, FIG. 3, is automatically indexed in a manner similar to the foregoing. As shown in FIGS. 3 and 9, the bearing block 122 which carries dog 121, FIG. 5, for translating the carriage 55, also carries a toothed bar 220, the teeth of which are spaced an amount corresponding to the distance between the columns of microimages on film sheet 45, FIG. 3. The left end of this toothed bar 220 carries a small wheel 228, FIG. 9, which rides on a raised track 229. In this manner, the engagement of detent pin 221, which is similar to the pin 201 shown in FIG. 12, with toothed bar 220 causes the selected column of microimages to be aligned with the projection means 150, FIG. 3. Detent pin 221 is attached to a lever 222 having a pivot 223 at its mid-portion. The lever 222 is actuated by a spring biased solenoid 224, dashpot 225 being provided to damp the spring action. The left end of lever 222 actuates a normally closed microswitch 230. To summarize, energization of solenoid 224 releases the film sheet carriage 55 so that it may be moved and also closes microswitch 230. Deenergization of solenoid 224 causes the film carriage 55 to be indexed to align the selected column of microimages on film sheet 45, and opens micro-switch 230.

Figure 13:
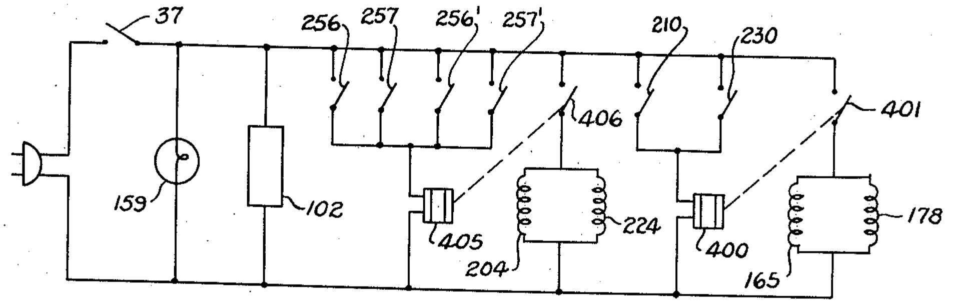
FIG. 13 is an electrical wiring diagram of the apparatus.

The functions of microswitches 210 and 230 associated with the indexing levers 203, 222 will now be described. Referring to FIG. 13, it will be seen that these switches are connected in parallel whereby the closure of either causes a relay 400 to be energized. Relay 400 in turn closes its contact 401 to apply energizing current to the film flattener removing solenoid 165 (see FIG. 4) and the flag raising solenoid 178. Hence, it will be evident that when the detent levers 203, FIG. 8, and 222, FIG. 3, are withdrawn to release their associated detent pins from the toothed members, the normally closed microswitches 210, 230 close and cause the film flattener 162, FIG. 4, to release the film sheet 45 and the flag 180 to raise so as to darken the viewing screen 35. In this manner, energization of the detent withdrawing solenoids 204, 224, FIG. 3, automatically places the film carriage in movable condition, and deenergization of those solenoids automatically aligns the selected microimage for projection and flattens that microimage against the window 161.

Accordingly the means for energizing and deenergizing the detent solenoids 204, 224, FIG. 3, will be described. The switches for these solenoids are contained in the control members 30, 31, FIGS. 1 and 3, and are so arranged that the application of operating torque to these members causes the switches to close. Referring to FIG. 10, it will be seen that the control member 31 is not directly attached to shaft 80, but rather freely rides on a Teflon bearing member 251. Attached to the underside of control member 31 is a projection 252 adapted to fit between the sides of a U-shaped channel 253, FIGS. 3 and 14, secured to a disc 254 which in turn is affixed to the shaft 80, FIG. 10. The projection 252 is narrower than the width of the channel 253, and the channel sides have holes through which the operating buttons of microswitches 256, 257 protrude. These microswitches are attached to the disc 254, and their wires pass through a hole 258 into the hollow interior of shaft 80. By this construction, actuation of the control member 31 causes it to rotate a small initial angle on its Teflon bearing 251. During such initial rotation, the projection 252, FIG. 10, depresses the button of the nearer microswitch, causing it to close its contacts. The projection 252 then engages the nearer side of the channel 253 and applies troque thereto. The torque is, of course, transferred to the disc 254 and thence to the shaft 80, FIG. 10. As previously explained, shaft 80 carries pulleys 79 and 82 which are linked to the cursor 27, and to the dog 121, FIG. 5, that translates the film sheet carriage 55 of FIG. 3. Accordingly, actuation of the control member 31 initiates three functions, namely, closure of one of the microswitches 256, 257, translation of cursor 27, and translation of the film carriage.

The other control member 30 is also provided with microswitches (not shown) that close during a small angle of initial rotation. The arrangement illustrated in connection with control member 31 may be adapted for rotation about the horizontal shaft 71, FIG. 3, or any equivalent thereto may be employed.

As previously mentioned, actuation of any one of the microswitches contained in the control members 30, 31 is adapted to energize the detent-releasing solenoids 204, 224, FIG. 3. Referring to FIG. 13, it will be seen that the microswitches 256, 257 in control member 31 and the microswitches designated 256′, 257′ and contained in control member 30 are all connected in parallel, whereby closure of any one of them causes relay 405 to be energized, whereupon its contact 406 closes to energize the detent-releasing solenoids 204, 224. It will be recalled that energization of these solenoids results in the closure of microswitches 210, 230, which in turn energizes the film flattener removing solenoid 165 and flag-raising solenoid 178, FIG. 4. Thus, actuation of either of control members 30, 31 causes the film carriage 55 and film sheet 45 to be released and the viewing screen 35 to be darkened. Conversely, release of both control members 30, 31 automatically causes the film carriage 55 to be indexed so that the selected microimage 46 is aligned with respect to the light of projection lamp 159, causes that microimage to be flattened into a predetermined image plane, and lowers the flag so that the image is projected onto the viewing screen.

To operate the apparatus, the searcher selectes the peek-a-boo members such as the cards 41, 41′, FIG. 2, that correspond to a search prescription, stacks them, and slips the stack onto surface 20 beneath the selector means 25, taking care to align the stack with the pins 21–23 and to clamp the stack in place with the clip mechanism 24. With switch 37, FIGS. 1 and 13, in the "on" position, the fluorescent lamp 102 disposed beneath the surface 20 is energized, whereby the peek-a-boo indications common to all cards in the stack are readily observable. By manipulating the control members 30, 31, the searcher sets the small square 29 of the selector 25 on one of the peek-a-boo indications, the first one to be set on usually being the one that is in the top left-hand position, since such position is the usual starting position in reading, although the indications may be set on in any desired order. While the searcher is actuating the control members, the viewing screen 35 is dark since the switches contained in these members are closed, causing the rotary solenoid 178 to raise the flag 180 associated therewith to block the light projected by lamp 159. As the searcher approaches the condition wherein the square 29 is set on a peek-a-boo indication, he applies correspondingly less torque to the control members 30, 31. As soon as the torque applied to both control members goes to zero or very nearly zero, the switches in the members open, causing the indexing solenoids 204, 224, FIG. 3, to release their spring-biased armatures and thereby align the selected row and selected column of microimages with respect to the light projected from lamp 159. As the levers 203, 222, driven by these armatures near their final position, they open the microswitches 210, 230, causing solenoids 165, 178 to be released, whereby the film sheet 45 is flattened into the predetermined image plane, and the flag 180 is lowered to allow the image of the abstract-citation corresponding to the selected peek-a-boo indication to appear on the viewing screen 35. In this manner, the operator is automatically freed from expending conscious effort to accurately set the selector on a peek-a-boo indication. As will readily be appreciated, such feature avoids fatiguing the searcher, enabling him to concentrate his efforts on his search.

Having obtained the short abstract-citation corresponding to the selected peek-a-boo indication, the searcher may read it, and if it appears to meet his search requirements, he may record it in any convenient manner. For example, he may copy the citation to the complete document by hand. Alternatively, the optical system of the apparatus may be provided with means to photograph the projected image by operation of a suitable control member.

If the projected abstract-citation does not appear satisfactory, the searcher will not copy it, but will proceed to set the selector means 25 on another peek-a-boo indication. If a number of unsatisfactory indications are obtained, he may review and modify his search prescription by selecting other peek-a-boo members.

In the above-described embodiment of the invention, the surface 20 carries the peek-a-boo members. As will readily be appreciated, it is only necessary that the surface receive peek-a-boo indications in a suitable manner. For example, the peek-a-boo indications could be arranged on the surface by projection of the images of peek-a-boo indications thereon. In a similar manner, the selector 25 need not overlay the surface 20. If desired, the selector 25 may be arranged so that its image lies over the surface 20, so that such image may be set on a selected peek-a-boo indication. In this connection, it is intended that the term "selector" be construed to include the situation wherein the image of an actual selector is set on peek-a-boo indications.

It is obvious that various changes may be made in the specific embodiments of the invention heretofore set forth without departing from the spirit of the invention. The invention is accordingly not to be limited to the specific structure shown and described, but only as indicated in the following claims.

What is claimed is:

1. Information retrieval apparatus comprising, at least one set of peek-a-boo members, said members collectively having an array of possible peek-a-boo indications each of which is dedicated to a different document, a film sheet having an array of microimages that are in one-to-one correspondence with said array of peek-a-boo indications, a film sheet carriage for holding said film sheet, image-projecting means, said film sheet carriage being positionable with respect to said image-projecting means to project an enlarged image of any microimage on said film sheet, means for holding selected ones of said set of peek-a-boo members, selector means adapted to be set on one of the peek-a-boo indications common to said selected ones of said peek-a-boo members, control means for setting said selector means on a selected peek-a-boo indication, said control means being operable to drive said film sheet carriage to position the microimage corresponding to said selected peek-a-boo indication for projection by said image-projecting means.

2. Apparatus as set forth in claim 1, wherein alignment means are provided, said alignment means being responsive to a predetermined minimum amount of applied force on said control means for aligning said film sheet carriage so that said microimage corresponding to said selected peek-a-boo indication is aligned with respect to said image-projecting means, whereby the selector means may be set within convenient tolerances on said selected peek-a-boo indication.

3. Apparatus as set forth in claim 2, where said alignment means includes means for moving said corresponding microimage into a predetermined image plane, whereby said projected image is automatically focused in response to a minimum amount of applied force on said control means.

4. Apparatus as set forth in claim 1, wherein said film sheet carriage is movable in first and second directions, said control means comprising first and second control members operable to drive said carriage in said first and second directions, respectively, said carriage having first and second means for indexing movement in each of said first and second directions in increments corresponding to the distance between the adjacent microimages on said film sheet as measured in each of said directions with respect to said image-projecting means, respectively; first and second detent means for engaging said first and second indexing means, respectively; first and second solenoid means for actuating said first and second detent means, respectively; and means for energizing both said first and second solenoids in response to an applied force of a magnitude exceeding a predetermined minimum to either of said first and second control members, whereby said detent means are automatically disengaged from said indexing means when forces in excess of said predetermined minimum are applied to said control members, and whereby said detent means are automatically engaged when the forces applied to said control members are below said predetermined minimum thereby causing the selected microimage to be aligned with respect to said image-projecting means.

5. Apparatus as set forth in claim 4, wherein each of said first and second control members comprises a handwheel having switches associated therewith, said switches being actuated by the application of torque in excess of a predetermined minimum torque.

6. Apparatus as set forth in claim 4, wherein said selector means comprises first and second cursors movable in first and second directions, respectively; the intersection of said cursors being adapted to be set on a desired peek-a-boo indication, said first and second cursors being driven by said first and second control members, respectively.

7. Apparatus as set forth in claim 4, wherein film flattening means are provided for moving the microimage adjacent said image-projecting means into a predetermined image plane, image-blocking means for blocking the image projected by said image-projecting means, means for removing said image-blocking means, both said film-flattening means and said removing means being operable in response to deactuation of either of said first and second detent means.

References Cited in the file of this patent

UNITED STATES PATENTS

| | | |
|---|---|---|
| 2,501,453 | Rowe et al. | Mar. 21, 1950 |
| 2,701,979 | Pratt et al. | Feb. 15, 1955 |
| 2,786,104 | Kirchel | Mar. 19, 1957 |
| 2,904,647 | Clavel | Sept. 15, 1959 |